(12) United States Patent
Drebinger

(10) Patent No.: US 8,112,606 B2
(45) Date of Patent: Feb. 7, 2012

(54) METHOD FOR STORING A DATA BLOCK CONTAINING DATA FOR CONTROLLING A TECHNICAL PROCESS, AND CONTROL AND AUTOMATION DEVICE

(75) Inventor: Andreas Drebinger, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 753 days.

(21) Appl. No.: 12/223,643

(22) PCT Filed: Oct. 31, 2006

(86) PCT No.: PCT/EP2006/067990
§ 371 (c)(1),
(2), (4) Date: Aug. 5, 2008

(87) PCT Pub. No.: WO2007/090474
PCT Pub. Date: Aug. 16, 2007

(65) Prior Publication Data
US 2009/0024811 A1    Jan. 22, 2009

(30) Foreign Application Priority Data
Feb. 6, 2006 (DE) .......................... 10 2006 005 313

(51) Int. Cl.
*G06F 12/00* (2006.01)
*G06F 12/02* (2006.01)
(52) U.S. Cl. .. 711/170; 711/154; 711/148; 711/E12.002
(58) Field of Classification Search .................. 711/173, 711/170, 112, 165, 161, 162, 171, 148, 154, 711/E12.001, E12.002
See application file for complete search history.

(56) References Cited

U.S. PATENT DOCUMENTS

| | | | | | |
|---|---|---|---|---|---|
| 6,070,202 | A | * | 5/2000 | Minkoff et al. | 711/171 |
| 6,934,700 | B1 | * | 8/2005 | Ijdens et al. | 711/209 |
| 7,411,966 | B2 | * | 8/2008 | Bruckner et al. | 370/401 |
| 2002/0131452 | A1 | * | 9/2002 | Bruckner et al. | 370/494 |
| 2003/0163805 | A1 | | 8/2003 | Hata | |
| 2004/0107237 | A1 | | 6/2004 | Kashiwada | |

FOREIGN PATENT DOCUMENTS

| | | |
|---|---|---|
| AU | 2006337975 B2 | 3/2011 |
| DE | 10146611 A1 | 4/2003 |
| JP | 2000137604 A | 5/2000 |
| JP | 2001273147 A | 10/2001 |
| JP | 2005128894 A | 5/2005 |
| SU | 1753477 A1 | 8/1992 |

OTHER PUBLICATIONS

Communication from Japanese Patent Office, Oct. 17, 2011, pp. 1-7.

* cited by examiner

*Primary Examiner* — Pierre-Michel Bataille

(57) ABSTRACT

The invention proposes a method and a control apparatus for storing a first data block containing data for controlling a technical process in a first memory area of an automation apparatus. In this case, a second data block containing data for controlling the technical process is stored in a second memory area of the automation apparatus. The first data block and the second data block are subdivided into a plurality of data areas. At least one data area which is part of the first data block is supplied to the automation apparatus and stored in the first memory area. Furthermore, at least one data area which is both part of the first data block and art of the second data block is copied from the second memory area into the first memory area. A corresponding automation apparatus is also proposed.

8 Claims, 3 Drawing Sheets

METHOD FOR STORING A DATA BLOCK CONTAINING DATA FOR CONTROLLING A TECHNICAL PROCESS, AND CONTROL AND AUTOMATION DEVICE

CROSS REFERENCE TO RELATED APPLICATIONS

This application is the U.S. National Stage of International Application No. PCT/EP2006/067990, filed Oct. 31, 2006 and claims the benefit thereof. The International Application claims the benefits of German application No. 10 2006 005 313.3 filed Feb. 6, 2006, both of the applications are incorporated by reference herein in their entirety.

FIELD OF INVENTION

The present invention relates to a method for storing a data block containing data for controlling a technical process in a memory area of an automation device. The present invention further relates to a control device for controlling the storage of the data block and to an automation device.

BACKGROUND OF THE INVENTION

For the purpose of controlling the technical process an automation device of the aforesaid kind typically contains a data block in which functions, parameters and other data for executing control sequences are specified. The data block is also referred to as a function block. The data block corresponds to an automation program or code for the sequence control system in the automation device.

When process control functions are being planned and configured, the desired automation functions for controlling the technical process are assembled, parameterized and interconnected in the form of graphical control blocks. The control blocks representing the automation functions are contained in a special program library, for example, from which they can be called. The parameterized and interconnected control blocks are equivalent to a configuration program which is subsequently supplied to a code generator which compiles the configuration program and converts it into a format which can be understood and processed by the automation device. The compiled configuration program generated by the code generator corresponds to the data block. The latter is typically subdivided into a plurality of data areas in which in particular data by means of which a specific sub-functionality can be executed is concentrated. The generated and compiled data block must subsequently be loaded into the automation device.

Usually a newly generated data block is supplied to the automation device in full, i.e. in particular complete with all its data areas, via a communication line connected to the automation device and a suitable communication service, and stored in said automation device. This normally happens during the operation of the automation device, i.e. while the latter is controlling the technical process by means of another data block stored in it. Said other data block is subsequently to be replaced by the new data block loaded into the automation device. As the data block may in certain cases, depending on the configuration on which it is based, contain a large volume of data, long load times can result when the data block is transferred to the automation device.

In contemporary instrumentation and control systems there is, however, a requirement for short generation and load times, in particular during commissioning of technical installations, in order to allow changes in the configuration, and hence also in the data block resulting therefrom, to take effect as quickly as possible in the automation device, and in the control of the technical process performed by it. Fast loading of the data block into the automation device is also made more difficult due to the fact that, between a control device for controlling the loading of the new data block, i.e. what is known as an application server, and the automation device, a plurality of communication channels are active on the communication line connecting them. Additional services that have to provide process values, alarms, etc. with very short delay times for the ongoing operation of the automation device are handled via said communication channels. Said additional services provide information relating to the current status of the process and receive suitable control commands. Said additional information and control channels have a much higher priority by comparison with the configuration channel that serves for transferring the new data block. Thus, only a limited bandwidth of the communication line is available for transferring the data of the new data block.

SUMMARY OF INVENTION

The object underlying the present invention is to enable a data block to be loaded into an automation device in a technically simple manner.

This object is achieved on the method side and on the device side by means of the technical teaching of the claims. Advantageous embodiments of the invention can be derived from the dependent claims.

With the inventive method for storing a first data block containing data for controlling a technical process in a first memory area of an automation device, wherein a second data block containing data for controlling the technical process is stored in a second memory area of the automation device and the first data block and the second data block are subdivided into a plurality of data areas, at least one data area which is part of the first data block is supplied to the automation device. The supplied first data block is then stored in the first memory area. Furthermore, at least one data area which is both part of the first data block and part of the second data block is copied from the second memory area into the first memory area.

The inventive control device for controlling the storing of a first data block containing data for controlling a technical process in a first memory area of an automation device which contains, in a second memory area, a second data block containing data for controlling the technical process, wherein the first data block and the second data block are subdivided into a plurality of data areas, is embodied such that it controls the supplying of at least one data area which is part of the first data block to the automation device. In addition it initiates the copying of at least one data area which is both part of the first data block and part of the second data block from the second memory area into the first memory area.

The inventive automation device contains a first memory area for storing a first data block containing data for controlling a technical process, and a second memory area in which a second data block containing data for controlling the technical process is stored, the first data block and the second data block being subdivided into a plurality of data areas. An interface is present for receiving at least one data area which is part of the first data block. In addition the automation device contains a controller for controlling the storing of the received at least one data area in the first memory area and for controlling the copying of at least one data area which is both part of the first data block and part of the second data block from the second memory area into the first memory area.

According to the present invention, load times for loading the first data block into the automation device can advantageously be kept short. A data area of the second data block which is already present in the automation device and which is also part of the first data block does not necessarily have to be supplied once again to the automation device. Rather, the already present data area can be copied within the automation device into the first memory area provided for the first data block. The first data block in this case contains updated data which is to be used for controlling the process in the future. The second data block contains momentarily current data which is used for example for controlling the process at the present moment in time. Functions, parameters and other data for executing instrumentation and control sequences that are controlled by the automation device are specified in the first and second data block. In particular data by means of which a specific sub-functionality can be executed during the controlling of the process by means of the automation device is concentrated in the data areas into which the data blocks are subdivided. The data blocks represent in particular an automation code which determines the sequencing control of the automation device. The at least one data area of the first data block which is supplied to the automation device is transferred to the latter in particular via an interface of the automation device from the outside. This is advantageous in particular when said at least one data area of the first data block is not part of the second data block. On account of the invention it is advantageously possible to keep the number of data areas of the first data block that are to be supplied to the automation device to a minimum. As a result a communication line that is used for supplying the data of the data areas is subject to very little load by the loading of the data areas of the first data block. Storing or assembling the first data block in the first memory area of the automation device or filling the first memory area with the first data block can therefore be performed particularly quickly. The invention is particularly effective above all when copying the at least one data area of the second data block that is already present in the automation device can be performed more efficiently in terms of time than supplying said data area from the outside. On the automation device side a service is provided which supports the copying of at least one data area between two memory areas provided for two data blocks. Furthermore, said service advantageously allows said copying to take place between different positions within the memory areas and the at least one supplied data area to be inserted at a specific position in the first memory area. It is advantageously possible to implement the invention particularly efficiently such that the computing time required for specifying a sequence for supplying a plurality of data areas to the automation device, and in particular also for copying data areas from the second into the first memory area, can be kept very short. Said specifying of the sequence is performed in particular in the inventive control device.

In an advantageous embodiment of the invention a check is carried out to determine whether one of the data areas of the first data block is also part of the second data block. This advantageously takes place before the data area is supplied to the automation device. By this means it can be ascertained particularly quickly and reliably and in an automated manner whether the at least one data area necessarily has to be supplied to the automation device or whether possibly it can be copied into the first memory area within the automation device.

In a further, particularly advantageous embodiment the volume of data contained in one of the data areas which is both part of the first data block and part of the second data block is determined. Depending on what volume of data is determined, the data area is either copied from the second memory area into the first memory area or supplied to the automation device and stored in the first memory area. In this way it can be ascertained in a simple manner whether it is more efficient to supply the at least one data area of the automation device from the outside or to copy it from one area to another within the automation device. The determined volume of data is preferably compared with a threshold data volume. The data area is then copied from the second memory area into the first memory area if the determined volume of data is greater than the threshold data volume. If the determined volume of data is less than the threshold data volume, the data area is supplied to the automation device and stored in the first memory area. By this means it can advantageously be ensured that the communication resources serving for supplying the data area are particularly efficiently utilized. When the threshold data volume is specified it can be taken into account in particular that, both for supplying and for copying the data area, control data accumulates which also imposes a load on the communication resources and on the automation device likewise.

Furthermore the threshold data volume is preferably specified as a function of a determined status of at least one component that is used for storing the first data block and/or for supplying the at least one data area of the first data block to the automation device. Such a component can be for example the inventive control device or a communication line that is used for supplying the at least one data area. This enables the threshold data volume to be adjusted particularly precisely to a current system environment of the automation device, and in particular to the latter itself. The threshold data volume can be particularly advantageously determined automatically. Toward that end, actual measurements of the current status of the at least one component can be performed in particular.

It is particularly preferred if the threshold data volume is specified adaptively. In this way the specifying of the threshold data volume can be adjusted progressively more precisely to the statuses of the at least one component. As a result the data areas of the first data block can be stored or assembled particularly efficiently.

Before the first data block is stored in the first memory area of the automation device, the copying of the at least one data area which is both part of the first data block and part of the second data block and the supplying of the at least one data area which is part of the first data block to the automation device are preferably validated. The specification of the sequence for supplying data areas to the automation device and for copying data areas within the automation device can thus be checked in advance for possibly occurring errors. The storing of the first data block can therefore be aborted where necessary or even not started at all. It would also be possible to supply the first data block complete with all data areas in its entirety to the automation device. A problematic retroactive effect on the control of the process by the automation device currently in operation can thus be advantageously avoided. The instructions contained in the sequence can be verified for example in a specific automation code loading device by simulating operations for supplying and copying data areas on the basis of available data.

BRIEF DESCRIPTION OF THE DRAWINGS

The invention and its advantages are explained in more detail below with reference to examples and exemplary embodiments and the accompanying drawing, in which.

Unless indicated otherwise, identical or functionally identical elements are labeled by the same reference signs throughout the figures.

DETAILED DESCRIPTION OF INVENTION

Figure 1:
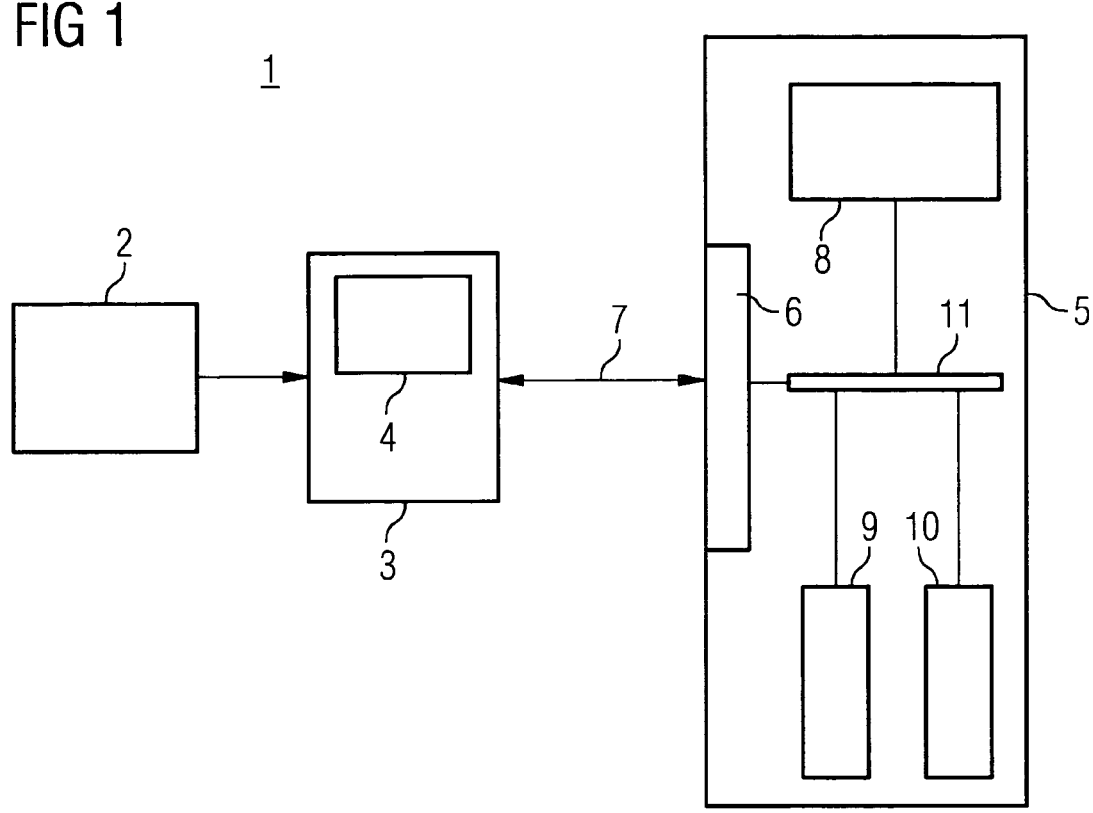
FIG. 1 shows a schematic block diagram of a process control system.

FIG. 1 shows a schematic block diagram of a process control system 1 for controlling a technical process which is implemented in an installation. Such an installation may be for example a power station or a chemical-plant. The process control system 1 includes a configuration device 2 by means of which instrumentation and control functions for controlling the technical process can be configured. For that purpose a graphical function plan is produced in which desired automation functions are placed, parameterized and interconnected in the form of graphical function blocks. The configuration device 2 includes inter alia a graphical user interface and a program library. The program library contains a plurality of control blocks which represent the graphical function blocks. At configuration time the control blocks are called from the program library, interconnected and provided with parameters. In this way a configuration program is assembled. The process control system 1 includes a control device 3 to which the assembled configuration program is supplied. The control device 3 has a code generator 4 which compiles the configuration program and translates it into a specific format. Said format can be processed by an automation device 5 of the process control system 1. The compiled configuration program corresponds to a data block in which the previously assembled functions, parameters and other data are contained. The data block serves the automation device 5 for controlling the process. Accordingly the data block represents the desired sequencing control that is to be executed by the automation device 5. The data block is subdivided into a plurality of data areas. The data concentrated in the data areas includes in particular data by means of which specific sub-functionalities for controlling the process can be executed by means of the automation device.

The automation device 5 includes an interface 6 via which it can receive data and signals from the outside and send data and signals to the outside. For that purpose the automation device 5 is connected to the control device 3 via a communication line 7. By way of the communication line 7 it is possible for, inter alia, the compiled data block, or parts thereof, such as, for example, one or more data areas, to be transferred from the control device 3 to the automation device 5 and received by the interface 6. Information and operation and control services by means of which process values and alarms, etc., and operation and control parameters for controlling the process are also exchanged and transferred via the communication line 7 between the control device 3 and the automation device 5. The automation device 5 additionally includes a controller 8 by means of which the sequences in the automation device 5 are controlled. The automation device 5 further includes a first memory area 9 for storing a first data block and a second memory area 10 for storing a second data block. Other memory areas for further data blocks may also be present. The automation device 5 controls the process by means of one of the data blocks contained in the memory areas 9, 10. For certain reasons or on certain occasions, such as, for example, in a fault situation, during commissioning of the system performing the process, for maintenance activities or in an optimization operation, the automation device 5 can switch over from the second to-the first data block, or vice versa, to allow a change in control of the process. The described components of the automation device 5, i.e. the interface 6, the controller 8 and the two memory areas 9 and 10, are connected to a bus 11 via which they can transfer data and signals.

In the present exemplary embodiment the second data block is already stored in the second memory area 10. At the present moment in time the automation device 5 controls the process by means of said second data block. The second data block is therefore a momentarily current data block. The first memory area 9 is still empty at this time: The aim is to store the first data block, which represents a configuration program that has been newly created by means of the configuration device 2 and compiled by the code generator 4, in the first memory area 9. The first data block is currently stored in the control device 3. The automation device 5 is to control the process in the future by means of the first data block. The first data block is therefore an updated data block which contains updated functions by comparison with the second data block, for example in order to optimize the execution of the process. The control device 3 now has the task, in conjunction with the automation device 5, of storing the newly created first data block in the first memory area 9.

According to the invention this operation does not entail transferring the first data block in its entirety from the control device 3 via the communication line 7 to the automation device 5. Rather, a check is first carried out to determine which of the data areas of the first data block are already contained in the second data block stored in the second memory area 10. If it is discovered that at least one data area is both part of the first and part of the second data block, then a check is carried out to determine whether it is better to supply said at least one data area to the automation device 5 via the communication line 7 from the control device 3 so that the latter stores it in the first memory area 9, or to copy said at least one data area within the automation device 5 from the second memory area 10 to a specific, predetermined position in the first memory area 9.

The examples described in the following with reference to FIGS. 2-5 illustrate possible approaches to storing or assembling data areas of the first data block in the first memory area 9. In FIGS. 2-5 the first memory area 9 containing the first data block is in each case shown on the extreme right, as it is ultimately to be stored or assembled in the first memory area 9. The assembling of the data areas in the first memory area 9 according to the illustration on the right thus corresponds to the objective of copy and transfer or supply operations that are to be carried out. Shown on the extreme left in each case in FIGS. 2-5 is the second memory area 10 containing the second data block, which is currently stored in the second memory area 10. To illustrate the procedure, between the first memory area 9 shown on the right with the target composition of the data areas of the first data block and the second memory area 10 shown on the left with the existing second data block the figures show one or more intermediate states in the storing of data areas in the first memory area 9 which result after copy and/or transfer operations have been carried out.

In the following examples a data area is represented by a rectangle containing a specific designation of the data area, e.g. data area A:

$$\boxed{A}$$

A copy operation for copying one or more data areas from the second memory area 10 to a predetermined position in the first memory area 9 is represented by two opposing curly brackets:

$$\} \longrightarrow \{.$$

Figure 2:
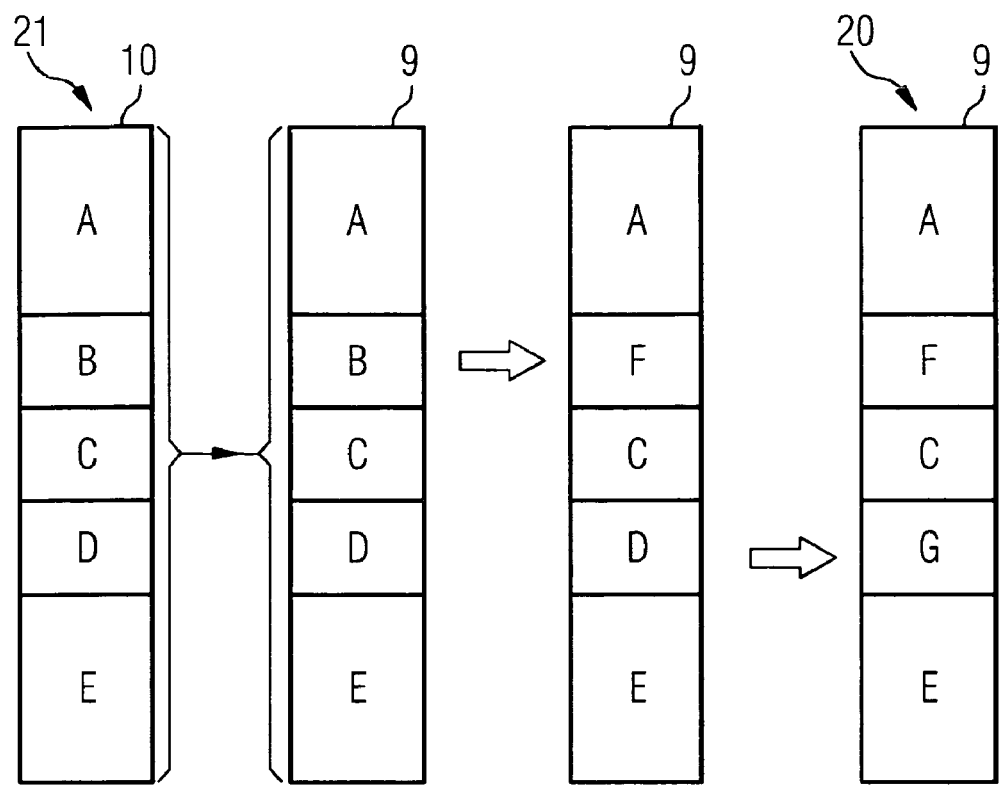
FIG. 2 shows a first example of the storing of a data block in a memory area of an automation device.

A transfer operation for supplying one or more data areas from the control device 3 to the automation device 5 in order to store the transferred data areas at a specific position in the first memory area 9 is represented by an arrow: $\Rightarrow$ FIG. 2 shows a first example of the storing or assembling of a first data block 20 in the first memory area 9 of the automation device 5. The first data block 20, as it is ultimately to be assembled, is shown on the right. The first data block 20 contains, in the following order from top to bottom, data areas A, F, C, G and a data area E. On the left FIG. 2 also shows a second data block 21 stored in the second memory area 10. Said second data block 21 contains, in the following order from top to bottom, data areas A, B, C, D and the data area E. It is assumed in this example that the data blocks 20 and 21 are structured in the manner of an index or register. This means that the same data areas are also present at the same positions in the two data blocks 20, 21. This simplifies a check that is to be carried out by the control device 3 in order to determine whether one of the data areas of the first data block 20 that is to be assembled is also contained in the second data block 21. In the present example the control device 3 has ascertained in the course of checking that the data areas A, C and E are contained at the same positions both in the second data area 21 and in the first data area 20 that is to be assembled. The data areas B and D of the second data block 21 are to be replaced by the data areas F and G, respectively, in the first data block 20.

In order to store or assemble the first data block 20, the complete second data block 21 is first copied in a copy operation from the second memory area 10 into the first memory area 9. The first memory area 9 then contains in this first intermediate state the data areas A, B, C, D and E, in that order. In a subsequent step the data area F is supplied in a transfer operation from the control device 3 via the communication line 7 to the automation device 5, received there by the interface 6 and within the automation device 5 stored between the data areas A and C in the first memory area 9. The previously stored data area B is overwritten in the process. Thus, according to the second intermediate state, the data areas A, F, C, D and E are stored, in that order, in the first memory area 9. In a subsequent step the data area G is then supplied in a further transfer operation by the control device 3 via the communication line 7 to the automation device 5, received there by the interface 6 and within the automation device 5 stored between the data areas C and E in the first memory area 9. The previously stored data area D is overwritten in the process. Thus, the data areas A, F, C, G and E are stored, in that order, in the first memory area 9. This assembling of the data areas in the first memory area 9 corresponds to the desired target composition of the data areas of the first data block 20.

In the present example according to FIG. 2 the first data block has therefore been assembled by means of one copy and two transfer operations. It was not necessary in this case for the data areas A, C and E associated with the first data block 20 to be supplied by the control device 3 via the communication line 7 to the automation device 5. A data volume resulting from said data areas A, C and E does not therefore have to be transferred via the communication line 7. In order to determine the most favorable combination of copy and transfer operations the control device 3 checks what volumes of data are contained in each of the data areas A, C and E which are both part of the first data block 20 and part of the second data block 21. Equally, the total volume of data contained in said data areas A, C and E can be ascertained. In order to determine whether it is more favorable to copy one of the data areas from the second memory area 10 or to supply it to the automation device 5 via the communication line 7, a threshold data volume is specified. In addition to the data volume of one or more of the data areas, the threshold data volume takes into account control data requiring to be transferred via the communication line 7, which control data accumulates during controlling of the transfer and supply of the one or more of the data areas via the communication line 7 to the automation device 5. For example, when data areas are transferred in two operations, as is the case in the example described previously with reference to FIG. 2 in the successive transfer of the two data areas F and G in two transfer operations, more control data accumulates than in a single transfer of one or more of the data areas. The determined volumes of data contained in the data areas A, C and E are compared with the threshold data volume. Depending on the result of said comparison, one or more of the data areas are copied from the second memory area 10 into the first memory area 9 if the determined volume of data contained in the one or more of the data areas is greater than or equal to the threshold data volume. If the determined volume is less than the threshold data volume, then the one or more of the data areas are supplied to the automation device and stored in the first memory area 9. In the first example described with reference to FIG. 2 the data volume of the data area C exceeds the threshold data volume. It is therefore more favorable to copy the data area C from the second memory area 10 into the first memory area 9, and hence to perform two transfer operations in order to transfer the data areas F and G, than to transfer the data areas F, C and G jointly via the communication line 7 and in that case control only a single transfer operation.

Figure 3:
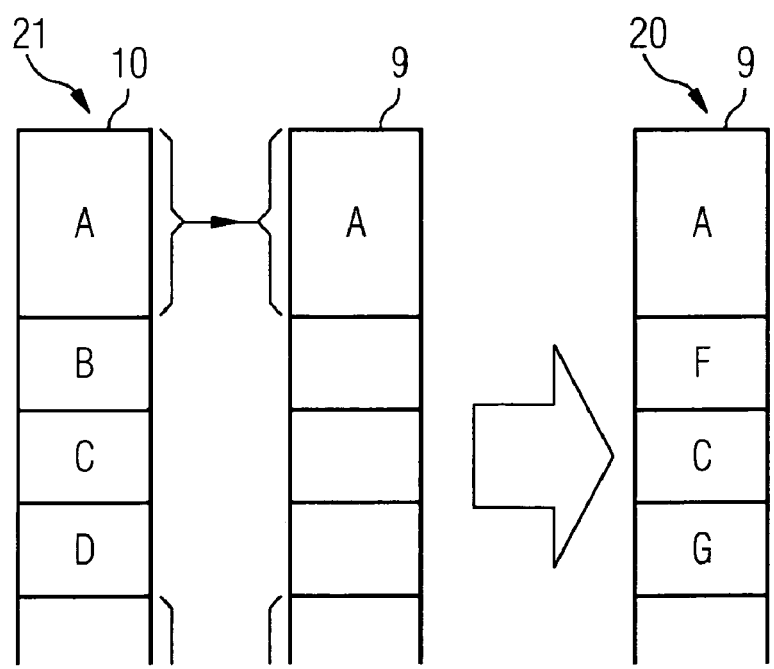
FIG. 3 shows a second example of the storing of a data block.

To illustrate this, FIG. 3 shows a second example of the storing of the first data block 20 in the first memory area 9. In this second example the data volume of the data area C is less than the specified threshold data volume. In a first step the data areas A and E are therefore copied separately to the same positions from the second memory area 10 into the first memory area 9. In the intermediate state according to FIG. 3 the first memory area 9 therefore contains the data areas A and E at the topmost position and bottommost position, respectively. It is also possible, instead of performing two separate copy operations for the data areas A and E, to perform a single copy operation with the data areas A, B, C, D and E of the entire second data block 21. In a second step a single transfer operation is then performed with the supplying of the data areas F, C and G from the control device 3 to the automation device 5. The supplied data areas F, C and G are inserted between the data areas A and E. The complete first data block 20 is then stored in the first memory area 9.

Figure 4:
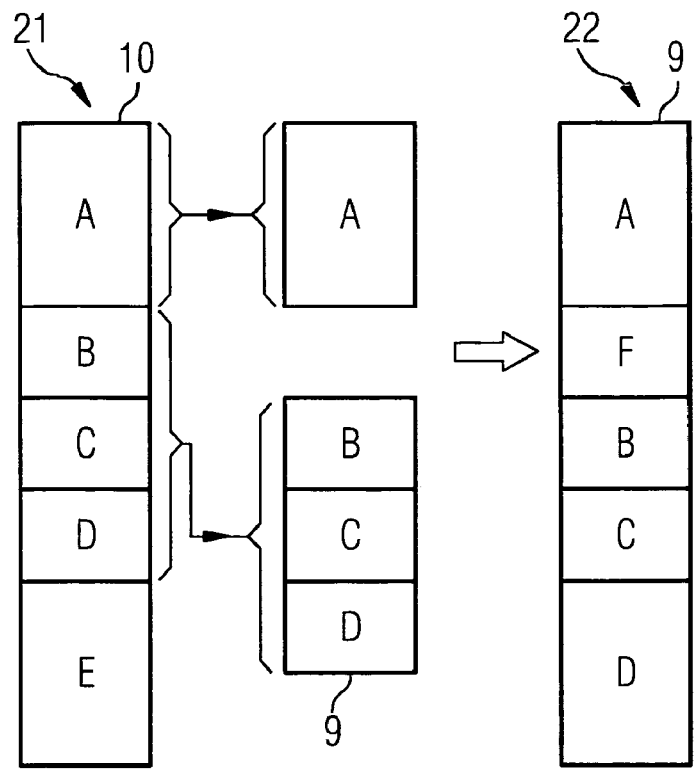
FIG. 4 shows a third example of the storing of a data block.

FIG. 4 shows a third example of the storing or assembling of a different first data block 22 in the first memory area 9 of the automation device 5. The first data block 22, as it is ultimately to be assembled, is shown on the right. The first data block 22 contains, in the following order from top to bottom, data areas A, F, B, C and D. On the left, FIG. 4 also shows the second data block 21 stored in the second memory area 10, containing the data areas A, B, C, D and E. It is assumed in this example that, in contrast to the examples according to FIGS. 2 and 3, the data blocks 21 and 22 are not structured in the manner of an index or register. This means that data areas can be inserted or deleted in the data blocks and adjacent data areas shifted accordingly. The same data areas are therefore not necessarily present at the same positions within the data blocks.

In the present example the control device 3 has established in the course of checking that the data areas A, B, C and D are contained both in the second data area 21 and in the first data area 22 that is to be assembled. The data area A is at the same position in both data blocks 21 and 22. In the first data block 22 the data areas B, C and D are provided in different positions in the first data block 22, shifted downward compared to the second data block 21. A new data area F is to be inserted between the data areas A and B of the first data block 22. The data area E of the second data block 21 is no longer required in the first data block 22.

In order to store or assemble the first data block 22, the data area A is first copied in a copy operation from the second memory area 10 into the first memory area 9. Also, the data areas B, C and D are copied in a copy and shift operation from the second memory area 10 to a different position in the first memory area 9. The first memory area 9 then contains in an intermediate state the data areas A, B, C and D, in that order, with storage space initially remaining empty between the data areas A and B. In a subsequent step the data area F is supplied in a transfer operation from the control device 3 via the communication line 7 to the automation device 5, received there by the interface 6 and within the automation device 5 stored in the first memory area 9 between the data areas A and B. Thus, the data areas A, F, B, C and D are stored, in that order, in the first memory area 9. This assembling of the data areas in the first memory area 9 corresponds to the desired target composition of the data areas of the first data block 22.

Figure 5:
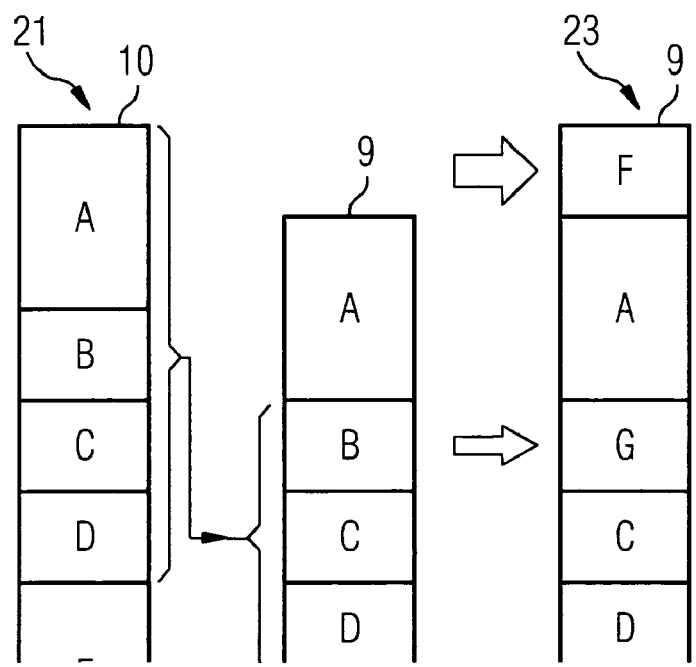
FIG. 5 shows a fourth example of the storing of a data block.

FIG. 5 shows a fourth example of the storing or assembling of a further first data block 23 in the first memory area 9 of the automation device 5. The first data block 23, as it is ultimately to be assembled, is shown on the right. The first data block 23 contains, in the following order from top to bottom, data areas F, A, G, C, D and H. On the left, FIG. 5 also shows the second data block 21 stored in the second memory area 10, containing the data areas A, B, C, D and E. It is again assumed in this example that data areas can be inserted or deleted in the data blocks 23 and 21 and adjacent data areas shifted accordingly. The same data areas are therefore not necessarily present at the same positions within the data blocks.

In the present fourth example the control device 3 has established in the course of checking that the data areas A, C and D are contained both in the second data area 21 and in the first data area 23 that is to be assembled. In the first data block 23 the data areas A, C and D are provided in different positions in the first data block 23, shifted downward compared to the second data block 21.

In order to store or assemble the first data block 23, the data areas A, C and D are first copied in a copy and shift operation from the second memory area 10 to different positions in the first memory area 9. The first memory area 9 then contains in an intermediate state the data areas A, B, C and D, in that order. In a subsequent step the data areas F, G and H are supplied in transfer operations from the control device 3 via the communication line 7 to the automation device 5, received there by the interface 6 and within the automation device 5 stored in the first memory area 9. The data area F is inserted at the topmost position in the first memory area 9, the data area H at the bottommost position and the data area G between the data areas A and C. The data area B is overwritten in the process. Thus, the data areas F, A, G, C, D and H are stored, in that order, in the first memory area 9. This assembling of the data areas in the first memory area 9 corresponds to the desired target composition of the data areas of the first data block 23.

In the combination of copy, shift and transfer operations described it was assumed in the fourth example that the data area G has a small data volume corresponding to that of the data area B. Otherwise a separate copying of the data area A on the one hand and the data areas C and D on the other hand would have been more efficient.

According to the present invention it is advantageously possible to specify the threshold data volume as a function of a determined status of at least one component of the process control system 1. This applies in particular to the communication line 7, the controller 8 and/or the bus 11 of the automation device 5. In particular the utilization of their capacities can be relevant thereto. This enables the threshold data volume to be adjusted particularly precisely to a current status of the process control system 1. The threshold data volume is determined in particular automatically. This can be accomplished particularly advantageously by adaptive means. Toward that end actual measurements of the current status of the at least one component can be carried out in particular.

Before one of the copy and/or transfer operations for storing the first data block 20, 22 or 23 in the first memory area 9 is actually performed it is advantageous in this case to validate or simulate the chosen combination, or sequence, of the copy and/or transfer operations. In this way possibly occurring errors can be identified before said operations are actually performed. It would then be possible to supply the complete first data block with all its data areas from the control device 3 to the automation device 5. A problematic retroactive effect on the control of the process by the automation device 5 currently in operation can thus be avoided.

The invention claimed is:

1. An automation device, comprising:
 a first memory area for storing a first data block containing data for controlling a technical process;
 a second memory area where a second data block containing data for controlling the technical process is stored, wherein the first data block and the second data block are subdivided into a plurality of data areas;
 an interface for receiving at least one data area that is part of the first data block; and
 a controller that controls:
  a storing of the received at least one data area in the first memory area,
  a copying of at least one data area which is both part of the first data block and part of the second data block from the second memory area into the first memory area,
  wherein the controller further determines a volume of data contained in one of the data areas which is both part of the first data block and part of the second data block, and based upon the determined volume, the controller either controls a copying of said one of the data areas from the second memory area into the first memory area, or controls a supplying of said one of the data areas to the automation device and storage of said one of the data areas in the first memory area.

2. A control device for controlling the storing of a first data block containing data for controlling a technical process in a first memory area of an automation device which contains a second data block containing data for controlling the technical process in a second memory area, the first data block and the second data block being subdivided into a plurality of data areas, comprising:
a controller portion that
controls the supplying of at least one data area which is part of the first data block, to the automation device,
initiates the copying of at least one data area which is both part of the first data block and part of the second data block from the second memory area into the first memory area, and
performs a determination of a volume of data contained in one of the data areas which is both part of the first data block and part of the second data block, and depending on the determined volume, either initiates a copying of said one of the data areas from the second memory area into the first memory area, or initiates supplying of said one of the data areas to the automation device and storage of said one of the data areas in the first memory area.

3. A method for storing a first data block containing data for controlling a technical process in a first memory area of an automation device, comprising:
storing a second data block containing data for controlling the technical process in a second memory area of the automation device;
subdividing the second data block into a plurality of data areas, wherein
at least one data area which is part of the first data block is supplied to the automation device and stored in the first memory area and
at least one data area which is both part of the first data block and part of the second data block is copied from the second memory area into the first memory area,
wherein a volume of data contained in one of the data areas which is both part of the first data block and part of the second data block is determined and, depending on what volume of data is determined, the data area is either copied from the second memory area into the first memory area or supplied to the automation device and stored in the first memory area.

4. The method as claimed in claim 3, wherein a check is carried out to determine whether one of the data areas of the first data block is part of the second data block.

5. The method as claimed in claim 3, wherein the determined volume of data is compared with a threshold data volume and the data area is copied from the second memory area into the first memory area if the determined volume of data is greater than the threshold data volume, and the data area is supplied to the automation device and stored in the first memory area if the determined volume of data is less than the threshold data volume.

6. The method as claimed in claim 5, wherein the threshold data volume is specified as a function of a determined status of at least one component used for storing the first data block and/or for supplying the at least one data area of the first data block to the automation device (5).

7. The method as claimed in claim 6, wherein the threshold data volume is specified adaptively.

8. The method as claimed in claim 7, wherein before the first data block is stored in the first memory area of the automation device the copying of the at least one data area is both part of the first data block and part of the second data block and the supplying of the at least one data area which is part of the first data block to the automation device are validated.

* * * * *